United States Patent [19]
Abe

[11] Patent Number: 5,966,204
[45] Date of Patent: Oct. 12, 1999

[54] NEAR-INFRARED MICROSCOPE

[75] Inventor: Katsuyuki Abe, Hachioji, Japan

[73] Assignee: Olympus Optical Co., Ltd., Tokyo, Japan

[21] Appl. No.: 08/886,441

[22] Filed: Jul. 1, 1997

[30] Foreign Application Priority Data

Jul. 2, 1996 [JP] Japan ..................... 8-172529

[51] Int. Cl.⁶ ................................. G02B 21/06
[52] U.S. Cl. ............................. 356/51; 359/371
[58] Field of Search ............. 356/51, 346; 359/370, 359/371

[56] References Cited

U.S. PATENT DOCUMENTS

| | | | |
|---|---|---|---|
| 4,964,707 | 10/1990 | Hayashi | 359/371 |
| 5,126,569 | 6/1992 | Carlson | 356/51 |
| 5,420,717 | 5/1995 | Tabata | 359/371 |
| 5,502,596 | 3/1996 | Suzuki . | |

OTHER PUBLICATIONS

H. Komatsu, "Foundamentals and Application of Optical Microscopy (3)", Jap. J. Appl. Phys., vol. 60, No. 10(1991), pp. 1030–1034.

Kettenmann et al., "Infrared Videomicroscopy of Living Brain Slices", Practical Electrophysiological Methods, 1992.

Sakmann et al., "Visualization of Nerve Cells Using IR–DIC", Single–Channel Recording Second Edition, pp. 202–206.

Dodt et al., "Visualizing unstained neurons in living brain slices by infrared DIC–videomicroscopy", Sep. 1990, pp. 333–336.

*Primary Examiner*—Richard A. Rosenberger
*Attorney, Agent, or Firm*—Pillsbury, Madison & Sutro LLP

[57] ABSTRACT

A near-intfrared microscope has a light source device for illumination for emitting near-infrared rays, an illuminating optical system for illuminating a specimen with illumination light from the light source device for illumination, and an observing optical system for observing the specimen. The light source device for illumination selectively produces an arbitrary wavelength in a wavelength region ranging from 600 to 900 nm. The illuminating optical system and the observing optical system include a contrast producing unit for yielding a contrast of the specimen. In this way, cells lying at a depth of at least 100 μm below the surface of the specimen can be observed, and even when an ordinary objective lens is used in the near-infrared region, imaging performance is not affected.

26 Claims, 10 Drawing Sheets

1

NEAR-INFRARED MICROSCOPE

BACKGROUND OF THE INVENTION

1. Field of the Invention

This invention relates to a near-infrared microscope used for internal observations and measurements on an organic specimen which is transparent or nearly transparent.

2. Description of Related Art

The field of biological research, is changing it's principal object from conventional, morphogenetic observation to the study of mechanisms that transmit information between cells. In keeping with this, an organic specimen which is greater in thickness (for example, a thickness of 200 to 300 $\mu$m or more) than previous ones has been often prepared in order to maintain a state as close to an "in vivo" state as possible. However, cells used as the specimen, which lie near the surface of a living body, suffer damage when they are cut off from the living body, and thus fail to bring about a state close to being "in vivo". Hence, in order to observe and measure the cells in a state close being to "in vivo", a lower cell layer lying at least about 50 $\mu$m below the surface of the specimen must be visualized. In a phase-contrast microscope widely used to visualize a transparent or nearly transparent specimen, however, when the thickness of the specimen is 200–300 $\mu$m, a phenomenon, referred to as "halo", peculiar to the phase-contrast microscope will occur, and thus it becomes difficult to observe microstructures inside the cells. This fact is disclosed by H. Komatsu, "Foundamentals and Application of Optical Microscopy (3)", Jap. J. Appl. Phys., Vol. 60, No. 10 (1991), pp. 1030–1034. On the other hand, even with a differential interference contrast microscope, observations on the specimen are severely affected by scattering of light attributable to the thickness of the specimen, and hence a visual observation is limited to a depth of about 20–30 $\mu$m below the surface of the specimen.

More recently, a technique has been developed in which infrared rays that cause ittle scattering are used in a differential interference contrast microscope to observe the interiors of living cells in a thick layer in combination with a contrast enhanced through image processing. The details of such techniques are set forth in the following citations.

Reference 1: Bert Sakmnann and Brwin Neher, "Single-Channel Recording", Second Edition Plenum, New York, pp. 202–206.

Reference 2: H. Kettenmann and R. Grantyn, "Practical Electrophys-iological Methods", Wiley-Liss, New York, pp. 6–10, (Infrared Videomicroscopy of Living Brain Slices).

Reference 3: H. U. Dodt and W. Zieglgänsberger, "Visualizing unstained neurons in living brain slices by infrared DIC-videomicroscopy", Brain Res., 537 (1990), pp. 333–336.

In particular, Reference 3 states that neurons lying about 50–100 $\mu$m below the surface of a specimen were observed in 300-$\mu$m thick rat brain slices.

The above citations bring out the results of observations on the cells which were obtained by using various filters as near-infrared transmitting filters. Specifically, Reference 1 uses a colored glass filter made by Schott, Germany, (trade name: RG9, its spectral transmittance characteristics are as plotted in the graph of FIG. 1). Reference 2 employs a combination of the RG9 filter made by Schott, identical with that of Reference 1, or an interference filter whose transmittance is maximized at a wavelength of 750 nm and a heat absorbing filter made by Schott (trade name: KG4, its spectral transmittance characteristics are as shown in the graph of FIG. 2). Further, Reference 3 uses an interference filter capable of transmitting light of wavelengths in the 750–1050-nm region. However, any of the near-infrared transmitting filters set forth in these citations is designed to transmit light whose wavelengths range from approximately 700 to 1200 nm, and has the following defects.

First of all, reference is made to the problem of chromatic aberration introduced by an imaging optical system, notably an objective lens, of the microscope. In general, the objective lens of the microscope is corrected for chromatic aberration on the assumption that wavelengths are in the visible region, namely the 450–650-nm region. Also, the level of such correction for chromatic aberration is expressed by the name of "apochromat" or "achromat".

An objective lens at the apochromat level, for example, is known by the disclosure of Japanese Patent Preliminary Publication No. Hei 6-160720. However, when an objective lens that is corrected for chromatic aberration, no matter whether this correction is made at the apochromat or achromat level, is used in the 700–1200nm wavelength region, chromatic aberration is remarkably produced, and thus the imaging performance of the objective lens relative to the interior of the specimen is deteriorated. Consequently, in spite of the fact that near-infrared rays with little scattering are used, the prior art merely allows observations on the cells lying at a depth of about 50–100 $\mu$m below the surface of the specimen.

Furthermore, the use of wavelengths in the 700–1200nm region may cause thermal deformation of a microscope body and a rise in temperature of the specimen. Specifically, although a halogen lamp is often used as a light source for illumination, radiation ranging in wavelength from about 900 to 1100 nm in this case has the highest intensity. In recent years, a technique, usually called "patch clamp", has been used in which, by a manipulator widely used in the field of biological microscopy, a minute glass electrode with a diameter of several micrometers is brought into close contact with the surface of a cell membrane to investigate the electrical characteristics of a Ca ion channel of the cell membrane. In this case, however, when a wavelength of 900–1100 nm reaches the specimen, its heat causes damage to the specimen or the condition of a solution for conserving the specimen becomes unstable. Consequently, the problem is encountered that it becomes difficult to bring the glass electrode into close contact with the surface of the cell membrane.

SUMMARY OF THE INVENTION

It is, therefore, an object of the present invention to provide a near-infrared microscope in which observations on the cells and manipulation relative thereto are surely performed at a depth of at least 100 $\mu$m below the surface of an organic specimen with a thickness of 200 to 300 $\mu$m or more, and at the same time, even when an ordinary objective lens to be corrected for chromatic aberration on the assumption that wavelengths are in the visible region is used in the near-infrared region, the imaging performance of the objective lens is not affected.

In order to achieve this object, according to one aspect of the present invention, the near-infrared microscope has a light source for emitting infrared rays so that the specimen is observed with illumination of the light source, and includes a wavelength selective element, interposed between the light source and the specimen, capable of transmitting an arbitrary wavelength among wavelengths ranging from 600 to 900 nm, and a contrast producing optical system for providing the specimen with a contrast.

According to another aspect of the present invention, the near-infrared microscope is equipped with an objective lens that is applicable to light of wavelengths in the visible region.

According to still another aspect of the present invention, an observation system of the microscope is constructed with the near-infrared microscope mentioned above, image pick-up means for electrically converting an image of the specimen formed through the near-infrared microscope, an image processor including image processing means for enhancing a contrast relative to an image signal from the image pick-up means, and an image display.

This and other objects as well as the features and advantages of the present invention will become apparent from the following detailed description of the preferred embodiments when taken in conjunction with the accompanying drawings.

DETAILED DESCRIPTION OF THE PREFERRED EMBODIMENTS

Figure 1:
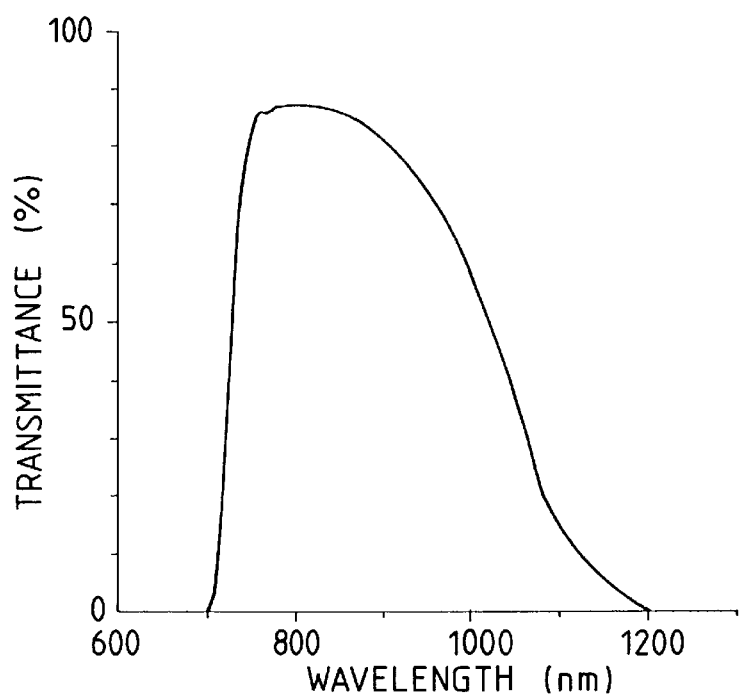
FIG. 1 is a graph showing spectral transmittance characteristics of a conventional colored glass filter.
Figure 2:
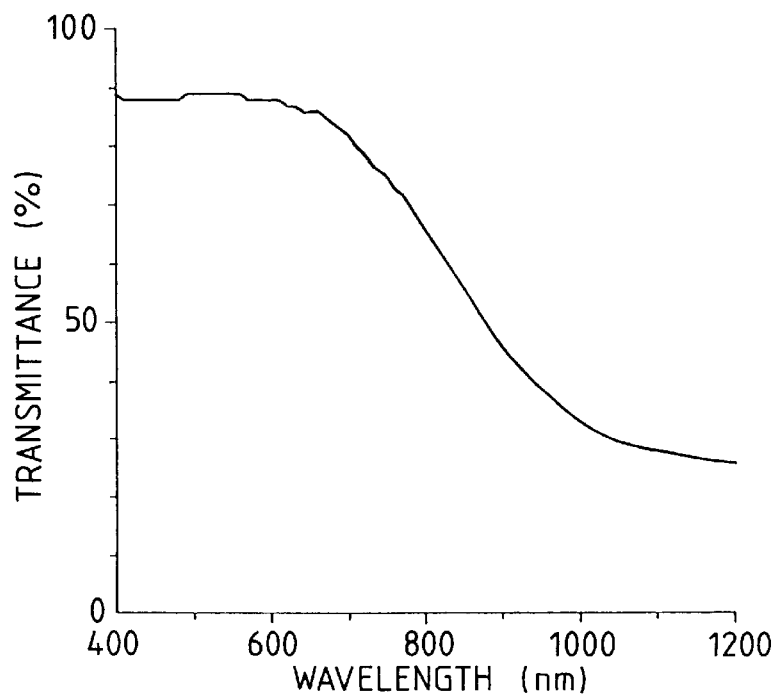
FIG. 2 is a graph showing spectral transmittance characteris-tics of a conventional heat absorbing filter.

The present invention uses an interference microscope having a contrast producing optical system for providing a transparent or nearly transparent specimen with a contrast. This optical system includes wavefront splitting means for breaking up a wavefront from a light source device for illumination into two segments which are in phase with each other, a condenser lens for irradiating the specimen with these segments, and wavefront combining means for recombining the two segments transmitted through the specimen so as to interfere with each other. Also, in this case, the wavefront splitting means and the wavefront combining means constitute a contrast producing unit.

Alternatively, the wavefront splitting means and the wavefront combining means may be replaced by components arranged as described below. A stop having a rectangular, semicircular, or sectoral aperture shifted from the optical axis of an illumination system is interposed between the light source device for illumination and the condenser lens so that what is called oblique illumination can be provided. Moreover, it is possible to provide the transparent specimen with a contrast by using the stop having the rectangular aperture shifted from the optical axis, disposed at the front focal point of the condenser lens, and a modulating element placed at the back focal point of an objective lens to gradually change the transmittance of transmitted light from the aperture and to provide amplitude modulation. With the phase-contrast microscope which has been used as the microscope having the optical system for providing the transparent specimen with the contrast, as mentioned above, the pheniomnenon, referred to as "halo", peculiar to the phase-contrast microscope is remarkably produced in regard to the specimen with a thickness of 200–300 μm. Furthermore, multiple diffraction is caused to the specimen observed and a phase disturbance of diffracted light makes the internal observation of the specimen difficult. As such, the interference microscope and the microscope utilizing the oblique illumination are used to obviate these defects. In this way, the contrast producing optical system is used in the interference microscope or oblique illumination microscope which is not easily affected in observation by the thickness of the specimen, compared with the phase-contrast microscope. In addition since observations are made, through this optical system with light of wavelengths ranging from 600 to 900 nm, the specimen, although thick, can be viewed to a deep layer with a good contrast.

For the interference microscope used in the present invention, the wavefront splitting means is constructed with a first polarizing means for polarizing light from the light source device for illumination in a predetermined direction and a first birefringent optical element for dividing the light polarized by the first polarizing means into two components, an ordinary ray and an extraordinary ray, whose vibrating directions are normal to each other. The wavefront combining means, on the other hand, includes a second birefringent optical element for recombining the ordinary and extraordinary rays and a second polarizing means for causing the two segments recombined by the second birefringent optical element to interfere with each other. That is, the interference microscope used in the present invention is constructed to be a so-called Nomarski differential interference contrast microscope. In particular, it is favorable, in view of cost and availability, that each of the first and second polarizing means be composed of a polarizing film oriented by containing dichromatic dye in a polymer film or of polarizing glass in which elongated silver crystals are arranged in the same direction.

Figure 3:
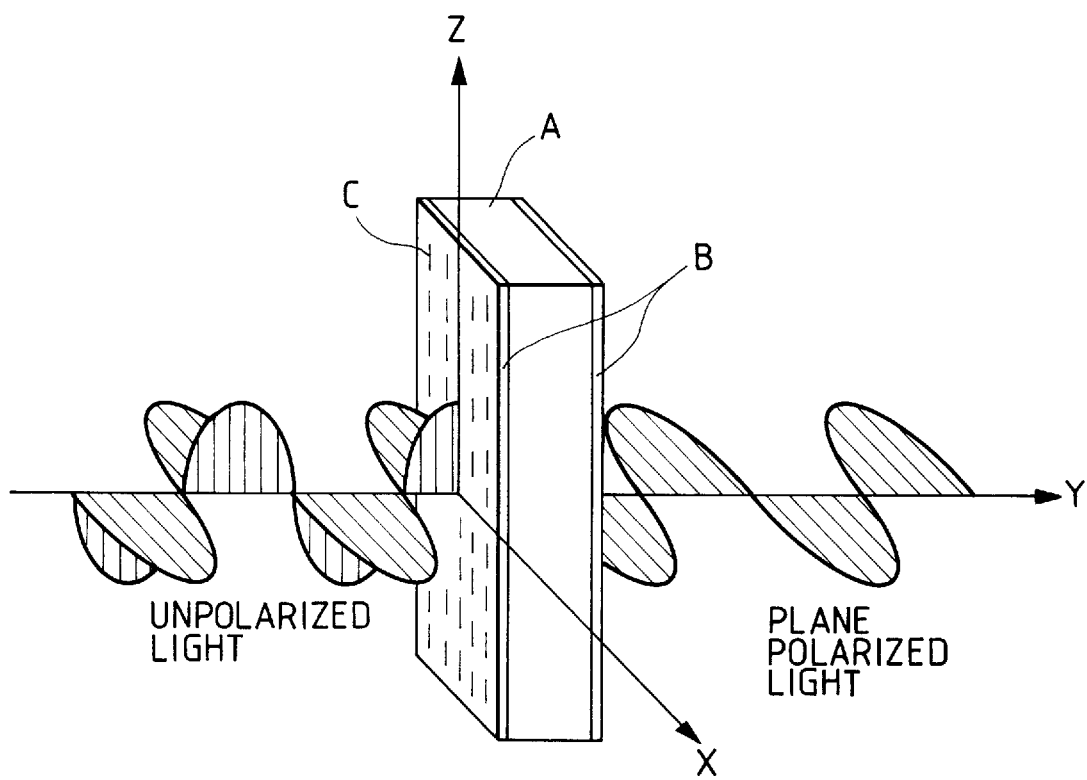
FIG. 3 is a view schematically showing the structure of polarizing glass used in the present invention.

FIG. 3 shows schematically the structure of this polarizing glass. In this figure, reference symbol A represents glass which constitutes a base and B represents layers, each having the property of polarization which is acquired by silver crystals C deposited near the surface of the glass A. Unpolarized light incident on the polarizing glass from the left-hand side of the figure is such that only a polarized component normal to the direction of elongation of the silver crystals C is transmitted through the polarizing glass, while a polarized component parallel thereto is absorbed. In this way, the light passing through the polarizing glass becomes plane-polarized light.

Although, as set forth in Reference 2, it is considered that a Glan Thompson prism having no dependence of the polarization property on wavelength is used as each polarizing element, there is the problem that the Glan Thompson prism is very expensive compared with the polarizing film and is not readily available.

The polarizing film, on the other hand, begins to undergo deterioration of the polarization property when a wavelength used is generally longer than 800 nm, and ceases to function as the polarizing element at a wavelength of not less than 900 nm. Thus, if a differential interference observation is made by using a wavelength of 700–1200 nm, the effect of differential interference will not be secured at wavelengths in a 900–1200nm region, and as a result, the differential interference observation substantially changes to a bright-field observation. Moreover, flare is produced and superimposed on a differential interference image formed by light of wavelengths in a 700–900-nm region. In this way, the imaging performance relative to the interior of the specimen is deteriorated, in spite of the fact that wavelengths with little scattering are used. Hence, if the wavelengths are limited to 600–900 nm, the property of polarization property will not be degraded even when the polarizing film of less cost is used, thus bringing about the effect that observations can be made with a good contrast.

From such a viewpoint, the light source device for illumination in the present invention is adapted to emit near-infrared light, and includes a light source for emitting light of wavelengths in the near-infrared region and at least one near-infrared selective filter for transmitting infrared light in a particular wavelength region. Near-infrared selective filters of this type include, for example, near-infrared transmitting filters and near-infrared reflecting filters. The light source used in the present invention refers to a light source for continuously emitting light of wavelengths ranging from the visible region to the infrared region as in a halogen lamp or xenon lamp. If the near-infrared selective filter is removably placed in an illumination optical path, an arrangement can also be made so that a wavelength bringing about a minimum brightness required for observation can be arbitrarily chosen from among the wavelengths ranging from 600 to 900 nm. Furthermore, since this near-infrared selective filter makes no use of wavelengths in the range of approximately 900–1100 nm at which the radiation intensity of the halogen lamp is high, an increase in temperature of the specimen can, of course, be suppressed to a minimum.

Additionally, it is desirable that the near-infrared selective filter transmits wavelengths ranging from 700 to 850 nm and particularly has an average transmittance of at least 80% with respect to wavelengths ranging from 750 to 800 nm. These conditions are provided for the purpose of securing a more favorable resolving power in the internal observation of the specimen. If the wavelength region in which near-infrared rays are transmitted deviates from the range of 700–850 nm and extends over a wide range, the deterioration of the property of polarization of the polarizing film becomes pronounced at wavelengths longer than 850 nm in the Nomarski differential interference contrast microscope using the polarizing film as the polarizing element, with a resulting reduction in contrast. At the wavelengths ranging from 750 to 800 nm, on the other hand, if the average transmittance is below 80%, an available image becomes darker, and even though the contrast is enhanced by the image processor, the microstructures inside the specimen are enclosed by electrical noise and ceases to be observable.

In the present invention, the light source device for illumination can also be constructed with at least one laser emitting laser light in the wavelength region of 600–900 nm. In this case, in order to prevent the laser light from interfering on tile specimen, it is desirable that an optical element having the function of reducing the coherence of the laser light is disposed on the emission side of the laser.

Also, where laser light with a plurality of wavelengths in the infrared region is emitted from a single laser, it is only necessary to place the near-infrared transmitting filter, mentioned above, on the emission side of the laser. Further, where the light source device is constructed with a plurality of lasers, it is only necessary to place a wavelength selective element for arbitrarily selecting a wavelength used, on the emission side of each laser. It is needless to say that the near-infrared transmitting filter, as well as the optical element having the function of reducing the coherence of the laser light, can be placed.

In the Nomuarski differential interference contrast microscope, it is desirable that an amount of separation $\delta$ between the ordinary and extraordinary rays produced by the wavefront splitting means satisfies the following condition in regard to a resolving power $\epsilon$ of the objective lens:

$$0.25\epsilon < \delta < 0.7\epsilon \quad (1)$$

where the resolving power $\epsilon$ is a value corresponding to a wavelength of 546.07 nm (the e line).

Eq. (1) is provided for the purpose of bringing about a more favorable resolving power and stereoscopic sensibility in the internal observation of a thick, organic specimen. It is well known that the resolving power and the stereoscopic sensibility in the differential interference contrast microscope are incompatible with each other, depending on the amount of separation $\delta$ between the ordinary and extraordinary rays. As mentioned above, when the patch clamp technique is used to observe the cells lying inside the organic specimen with a thickness of 200–300 $\mu$m, whether the surface of the cell membrane can be clearly visualized affords the key to the success of this technique. It is thus important to maintain the balance between the resolving power and the stereoscopic sensibility. In Eq. (1), if the amount of separation $\delta$ is smaller than the value of $0.25\epsilon$, the influence of the thickness of the specimen on scattering of light will be lessened and the resolving power can be improved, but the contrast becomes extremely low. In order to repair this defect by enhancing the contrast through the image processor, a larger amount of light than is necessary must be made incident on the specimen to improve the S/N ratio on the principle of contrast enhancement. This causes thermal deformation of the microscope body and an increase in temperature of the specimen, leading to an unfavorable result. Conversely, if the amount of separation δ is larger than the value of 0.7ε, the influence of the thickness of the specimen on the scattering will be heightened, not to speak of a reduction of the resolving power, and the stereoscopic sensibility of the image of the specimen will be weakened which must be essentially improved.

Figure 4:
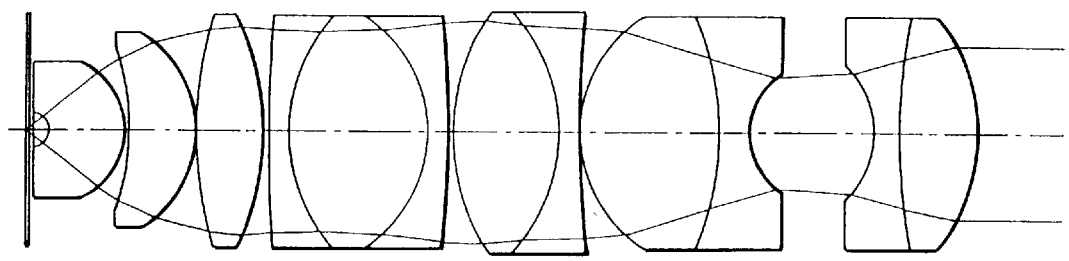
FIG. 4 is a sectional view showing the arrangement of an objective lens for microscopes at an apochromat level.
Figure 5:
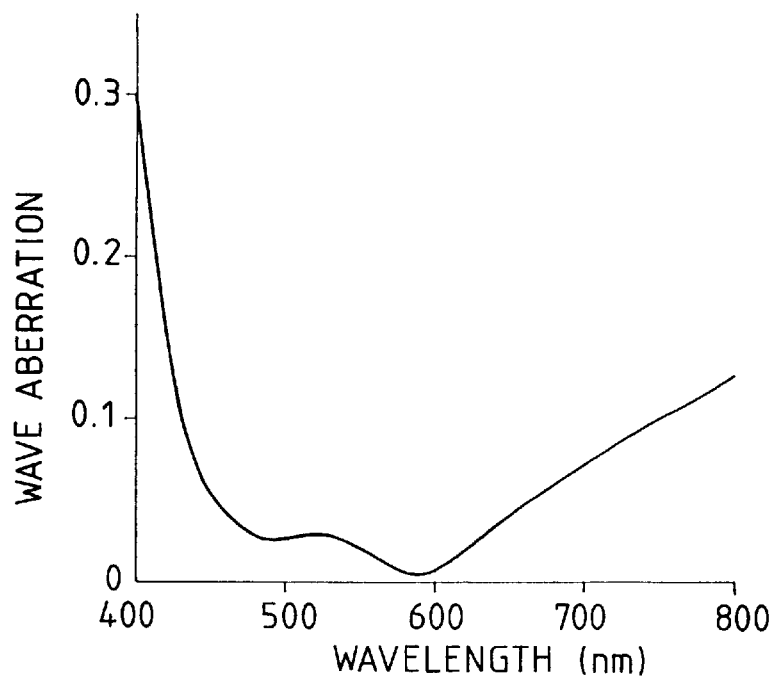
FIG. 5 is a graph showing numerical values of chromatic aberration plotted against wavelengths in a 400–700 nm region where a reference wavelength is 587.56 nm (the d line) in the objective lens of FIG. 4.
Figure 6:
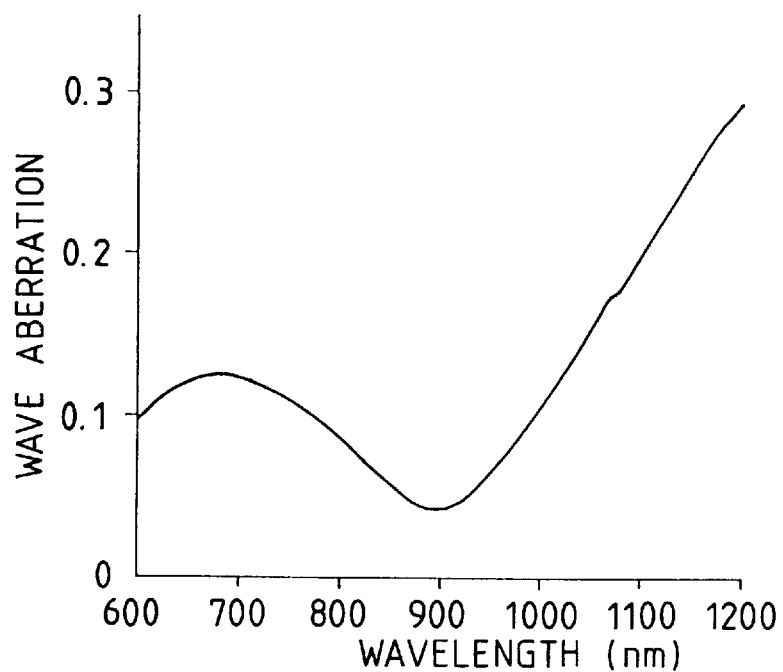
FIG. 6 is a graph showing numerical values of chromatic aberration plotted against wavelengths in a 700–1200nm region where the reference wavelength is 900 nm in the objective lens of FIG. 4.
Figure 7:
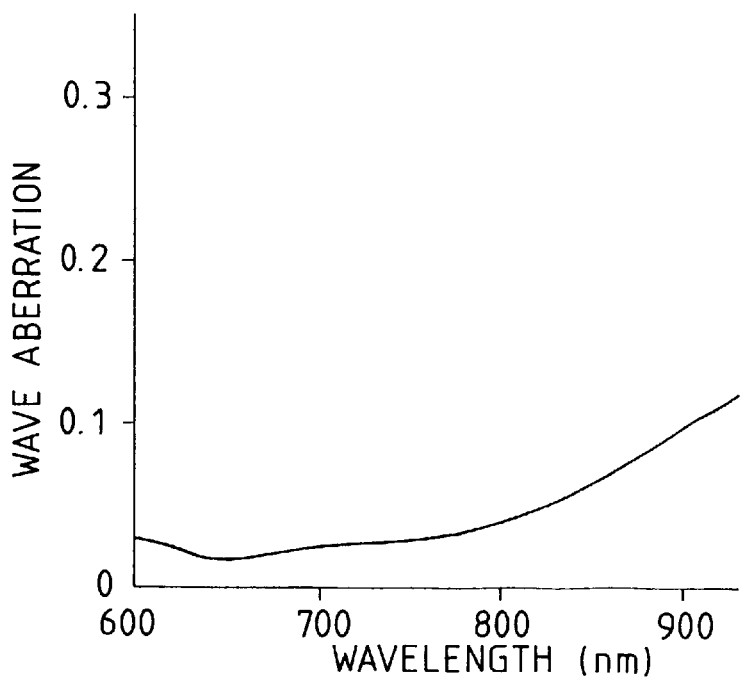
FIG. 7 is a graph showing numerical values of chromatic aberration plotted against wavelengths in a 700–900-nm region where the reference wavelength is 750 nm in the objective lens of FIG. 4.

Subsequently, a description will be given of an objective lens used in the present invention. FIG. 4 shows the arrangement of an objective lens for microscopes at the apochromat level, disclosed in Hei 6-160720 mentioned above. Considering the Marechal's criterion (about 0.07λ, where λ=wavelength) as a measure of nonaberration, the objective lens shown in FIG. 4, as seen from the graph of FIG. 5, is surely corrected for chromatic aberration at the apochromat level in the visible region. However, as seen from the graph of FIG. 6, when the reference wavelength is 900 nm and the wavelength region used for observation extends over a wide range of 700–1200 nm, the objective lens, although it is at the apochromat level, suffers severely from chromatic aberration. Thus, as shown in FIG. 7, when the reference wavelength is 750 nm and the wavelength region for observation is set in the range of 600–900 nm, it is found that the chromatic aberration is kept to a minimum.

In this way, when the wavelength region for observation extends over the wide range of 700–1200 nm, even the objective lens at the apochromat level is exceedingly subject to chromatic aberration.

However, in the present invention which uses the near-infrared selective filter capable of transmitting light of wavelength 600–900 nm as mentioned above, even where the objective lens of an ordinary microscope which is corrected for chromatic aberration in the visible region, namely the 450–650-nm region, is used as it is, the chromatic aberration can be held to a minimum. As such, the present invention is capable of using the objective lens at the apochromat level which has practical use in a wide range. This is advantageous in regard to cost.

Here, there is an approach for designing a new objective lens which can be corrected for chromatic aberration in the wavelength region ranging from the visible to the near-infrared. In the field of biological research in recent years, however, cases not unfrequently occur in which, in order to measure, for example, a Ca ion concentration, a reflecting fluorescence illumination device is used to irradiate the specimen with ultraviolet light of wavelengths in the range of about 340–380 nm. Thus, an objective lens with a high transmittance of ultraviolet light becomes necessary. However, it is very difficult to design and manufacture an objective lens which satisfies all these requirements, that is, which can be corrected for chromatic aberration in the wavelength region ranging from the visible to the near-infrared and at the same time, has a high transmittance of ultraviolet light. Moreover, costs are remarkably increased. This fails to bring about proper means for attaining tile object.

Referring to the embodiments shown in the drawings, the present invention will be described in detail below.

First Embodiment

Figure 8:
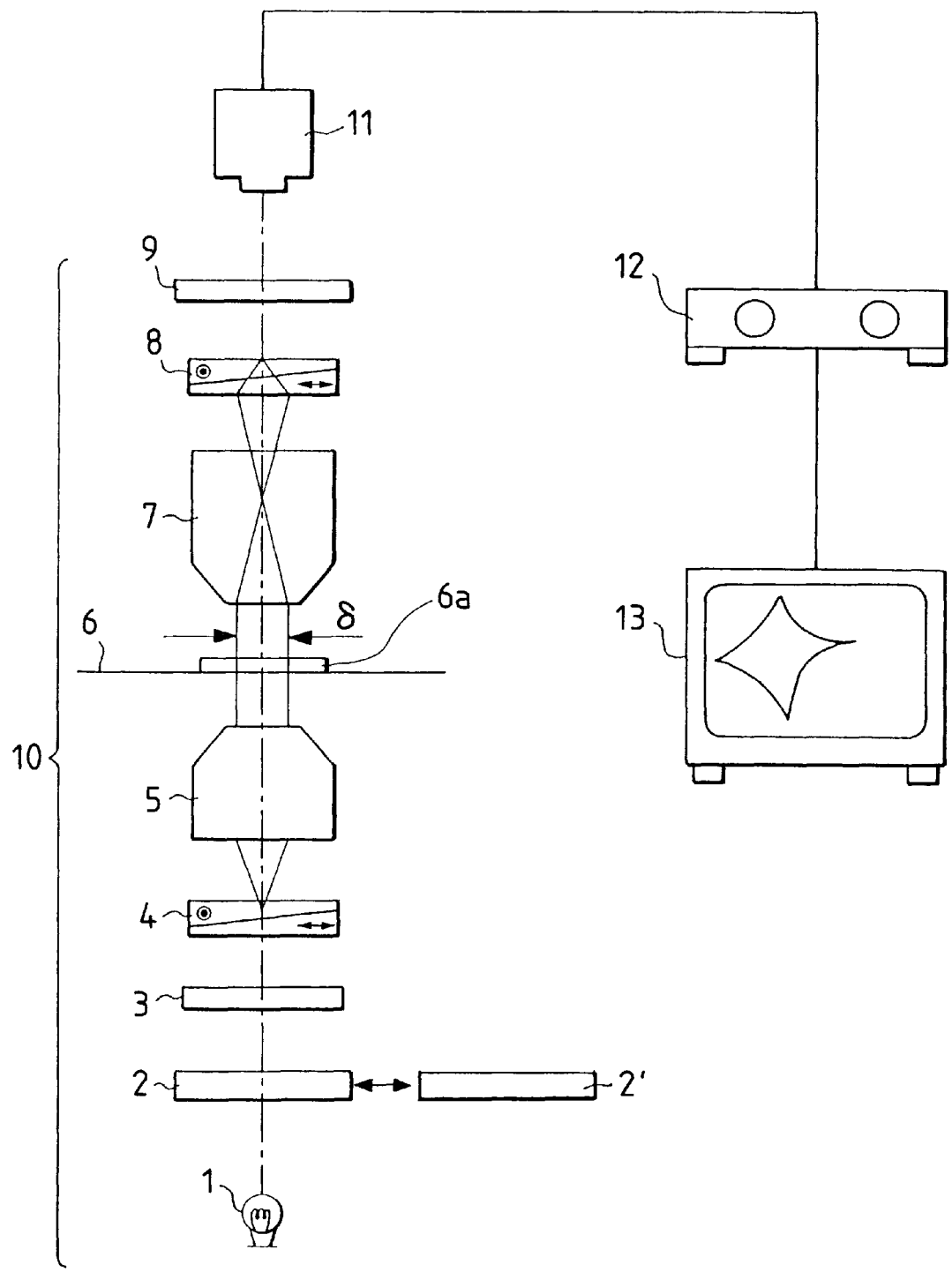
FIG. 8 is a view showing the arrangement of the observation system of the near-infrared microscope of a first embodiment in the present invention.

FIG. 8 shows the arrangement of the observation system of the near-infrared microscope in this embodiment. A near-infrared microscope 10 used in the observation system of the microscope of the first embodiment includes a halogen lamp 1 which is a light source for illumination; a near-infrared transmitting filter 2; a polymer polarizing film 3; a birefringent optical element 4 for splitting light emitted from the halogen lamp 1 into two components, an ordinary ray and an extraordinary ray; a condenser lens 5; a stage 6 on which a specimen 6a is mounted; an objective unit 7; a birefringent optical element 8 for recombining the ordinary and extraordinary rays; and a polymer polarizing film 9.

In the first embodiment, the halogen lamp 1 and the near-infrared transmitting filter 2 constitute the light source device for illumination. An illuminating optical system is constructed with the polymer polarizing film 3, the birefringent optical element 4, and the condenser lens 5, while an observing optical system includes the objective unit 7, the birefringent optical element 8, and the polymer polarizing film 9. A unit for yielding the contrast of the specimen 6a includes the polymer polarizing films 3 and 9 and the birefringent optical elements 4 and 8 which are arranged in the illuminating and observing optical systems. Also, instead of each of the polymer polarizing films 3 and 9, the polarizing glass oriented by the silver crystals, as shown in FIG. 3, can be used.

In the near-infrared microscope 10, the light emitted from the halogen lamp 1 is transmitted through the near-infrared transmitting filter 2 and is linearly polarized by the polymer polarizing filter 3. Subsequently, by the birefringent optical element 4 placed so that a point where the light is split into the ordinary and extraordinary rays coincides with the front focal point of the condenser lens 5, the ordinary and extraordinary rays are separated by the amount of separation δ through the condenser lens 5, with respect to the specimen 5. The ordinary and extraordinary rays transmitted through the specimen 6a, after traversing the objective unit 7, are recombined by the birefringent optical element 8, and interfere with each other when transmitted through the polymer polarizing film 9, so that the image of the specimen 6a is formed on the imaging plane of the near-infrared microscope 10.

Figure 9:
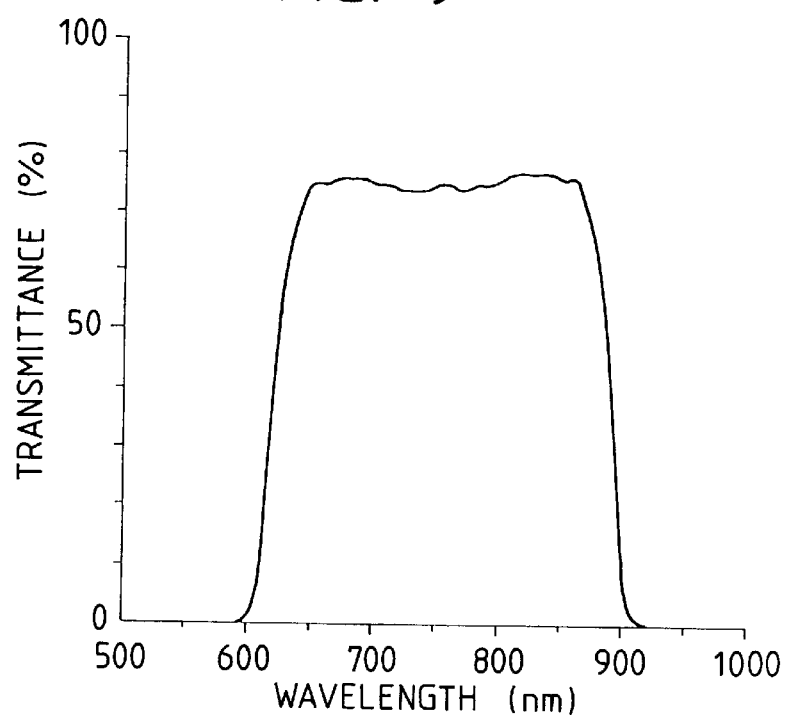
FIG. 9 is a graph showing spectral transmittance characteristics of a near-infrared transmitting filter used in the observation system of the microscope of the first embodiment.

Here, the spectral transmittance characteristics of the near-infrared transmitting filter 2 used in the near-infrared microscope 10, as plotted in FIG. 9, are such that light of wavelengths in the range of 600–900 nm can be transmitted through the filter 2. The magnification of the objective unit 7 is 40× for water immersion, the numerical aperture thereof is 0.7, and the amount of separation δ between the ordinary and extraordinary rays is 0.3 μm. In the first embodiment, a Wollaston prism is used as the birefringent optical element 4, while a modified Wollaston prism, usually called a Nomarski prism, is used as the birefringent optical element 8 because the back focal point of the objective unit 7 is located inside the objective unit 7.

Figure 10:
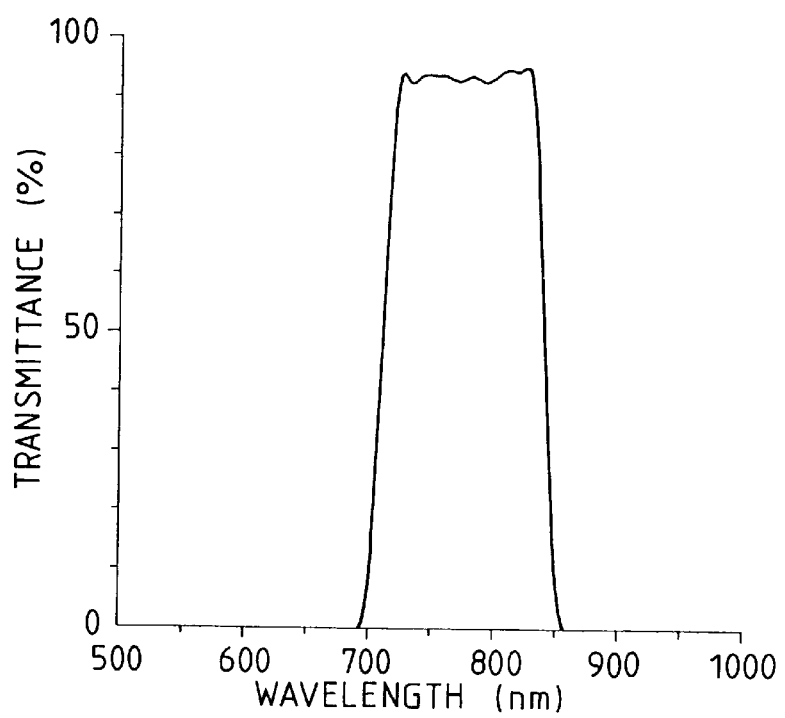
FIG. 10 is a graph showing spectral transmittance characteristics of the near-infrared transmitting filter used in the observation system of the microscope of a second embodiment in the present invention.

When the near-infrared transmitting filter 2, as shown in FIG. 8, is designed so that it can be used interchangeably with a near-infrared transmitting filter 2' having the spectral transmittance characteristics plotted in FIG. 10, optimum illumination can be selected in accordance with a specimen. For an interchange of the near-infrared transmitting filters 2 and 2', it is only necessary to utilize a slider mechanism used in a conventional microscope.

Furthermore, in the near-infrared microscope of the first embodiment, the light-receiving surface of an electronic image pick-up device 11 is situated at the imaging plane of the near-infrared microscope 10 so that the image derived from the near-infrared microscope 10 is received by the electronic image pick-up device 11 and transmitted as an image signal to an image processor 12. In this way, a so-called microscope observation system can be constructed. The image processor 12 is equipped with image processing means for enhancing the contrast of the image signal, which after contrast enhancement, is transmitted to a display monitor 13.

Also, in the first embodiment and other embodiments which will be described below, it is assumed that lenses, not shown, are properly located between the light source and the condenser lens and between the objective unit and the electronic image pick-up device so that illumination and image formation can be correctly realized.

Second Embodiment

The observation system of the near-infrared microscope of this embodiment has the same arrangement as that of the first embodiment shown in FIG. 8. The second embodiment takes the case where the infrared transmitting filter 2' is disposed in the optical path in FIG. 8. Thus, the spectral transmittance characteristics of the near-infrared transmitting filter 2', as plotted in FIG. 10, are such that light in the 700–850-nm wavelength region can be transmitted through the filter 2'. The magnification of the objective unit 7 is 60× for water immersion, the numerical aperture thereof is 1.2, and the amount of separation δ between the ordinary and extraordinary rays is 0.08 $\mu$m.

Third Embodiment

Figure 11:
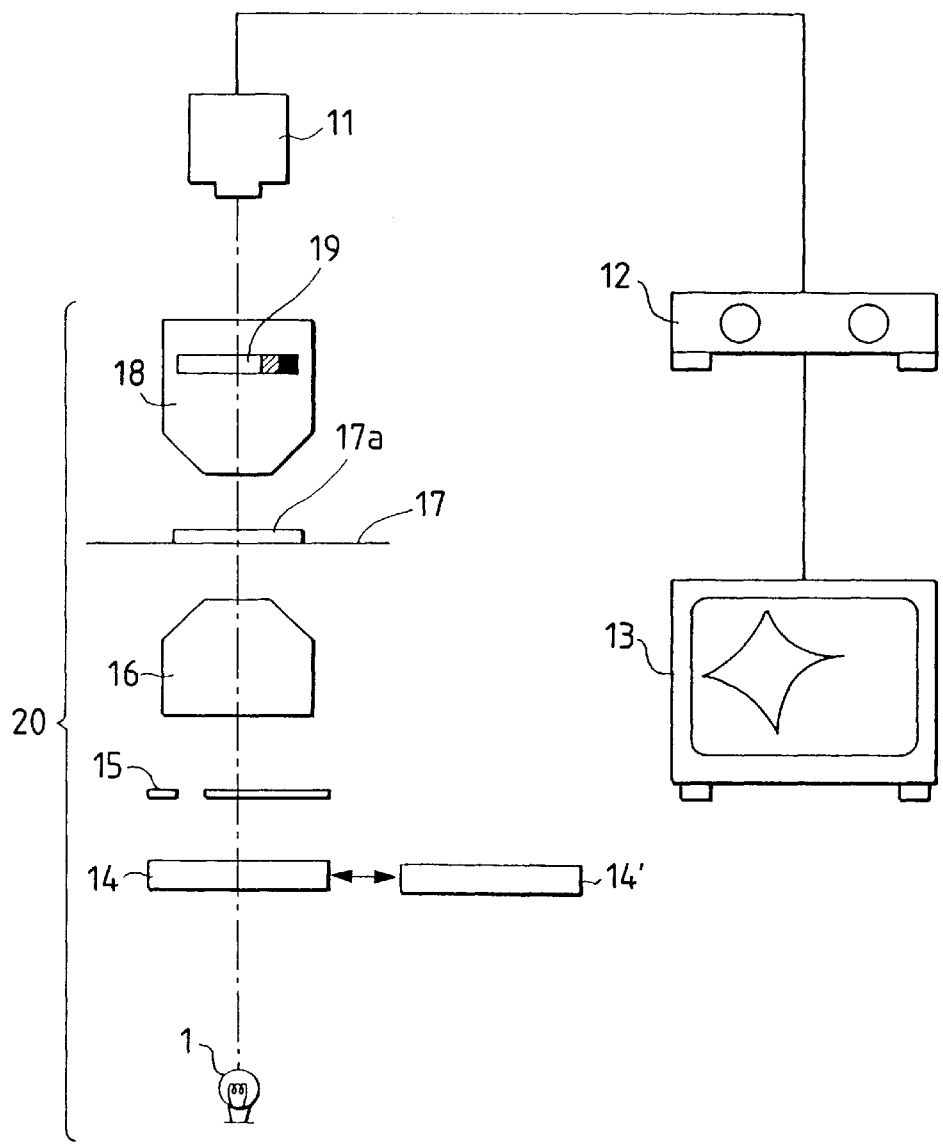
FIG. 11 is a view showing the arrangement of the observation system of the microscope of a third embodiment in the present invention.

FIG. 11 illustrates the arrangement of the observation system of the near-infrared microscope in this embodiment. A near-infrared microscope 20 used in the microscope observation system of the third embodiment is constructed with the halogen lamp 1 which is the light source for illumination; a near-infrared transmitting filter 14; a stop 15 having a rectangular aperture shifted from the optical axis of the illuminating optical system; a condenser lens 16: a stage 17 on which a specimen 17a is mounted; an objective unit 18; and a modulating element 19 for gradually changing the transmittance of light transmitted through the rectangular aperture of the stop 15 to provide the transmitted light with amplitude modulation.

In the third embodiment, the halogen lamp 1 and the near-infrared transmitting filter 14 constitute the light source device for illumination. The illuminating optical system is comprised of the stop 15 having a rectangular aperture and the condenser lens 16, while the observing optical system includes the objective unit 18 and the modulating element 19. A unit for yielding the contrast of the specimen 17a includes the stop 15 having the rectangular aperture and the modulating element 19. Also, this arrangement is usually called Hofmann modulation which is disclosed in U.S. Pat. No. 4,062,619.

In the near-infrared microscope 20, the light emitted from the halogen lamp 1 is transmitted through the near-infrared transmitting filter 14 and after passing through the rectangular aperture of the stop 15 and the condenser lens 16, is incident on the specimen 17a mounted on the stage 17. In a process ahead of incidence of illumination light on the specimen 17a, the modulating element 19 gradually changes the transmittance of the light transmitted through the rectangular aperture of the stop 15 to provide the transmitted light with amplitude modulation. In this way, the light incident on the specimen 17a is capable of yielding the contrast for the transparent specimen 17a. The light transmitted through the specimen 17a traverses the objective unit 18 and the modulating element 19 and forms the image of the specimen 17a on the imaging plane of the near-infrared microscope 20.

Figure 12:
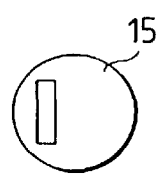
FIG. 12 is a view showing the shape of a stop having a rectangular aperture used in the observation system of the microscope of the third embodiment.
Figure 13:
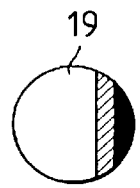
FIG. 13 is a view showing the shape of a modulating element used in the observation system of the microscope of the third embodiment.

Here, the spectral transmittance characteristics of the near-infrared transmitting filter 14 used in the near-infrared microscope 20, as shown in FIG. 9, are such that light of wavelengths in the range of 600–900 nm can be transmitted through the filter 14. The magnification of the objective unit 18 is 40× for water immersion and the numerical aperture thereof is 0.7. The stop 15 having the rectangular aperture is disposed at the front focal point of the condenser lens 16, while the modulating element 19 is placed at the back focal point of the objective unit 18. FIGS. 12 and 13 show the shapes of the stop 15 with the rectangular aperture and the modulating element 19, respectively, viewed from above. In FIG. 13, the transmittances of light are about 90% or more for a white part, about 15% for a hatching part, and 0% for a black part.

In the near-infrared microscope of the third embodiment, like the first embodiment, the light-receiving surface of an electronic image pick-up device 11 is situated at the imaging plane of the near-infrared microscope 20 so that the image derived from the near-infrared microscope 20 is received by the electronic image pick-up device 11 and transmitted as an image signal to the image processor 12. In this way, the so-called microscope observation system can be obtained. The image processor 12 is equipped with image processing means for enhancing the contrast of the image signal, which after contrast enhancement, is transmitted to the display monitor 13.

The near-infrared transmitting filter 14 of the third embodiment, as in the first embodiment, can be placed, in the optical path, interchangeably with a near-infrared transmitting filter 14' having spectral transmittance characteristics that are different from those of the near-infrared transmitting filter 14.

Subsequently, reference is made to a specific observation technique which uses the microscope observation system shown in the second embodiment. The differential interference contrast microscope used as the near-infrared microscope 10 is an Olympus Model BHWI microscope. In this microscope, the near-infrared transmitting filter 2 capable of transmitting light of wavelengths in the range of 700–850 nm, with characteristics such as those shown in FIG. 10, is placed in the illumination optical path. The cerebellum of rat brain slices is used as the specimen 6a. A combination of an Olympus W Plan FL 40× UV objective (the numerical aperture=0.7) of a water immersion type and a 2.5× magnifying lens is used as the objective lens 7. Further, a Hamamatsu Photonics C2741-07ER visible/near-infrared TV camera is used as the electronic image pick-up device 11, an Olympus XL-10 image processor as the image processor 12, and a Hamamatsu Photonics C1840-3 TV monitor as the display monitor 13.

Figure 14:
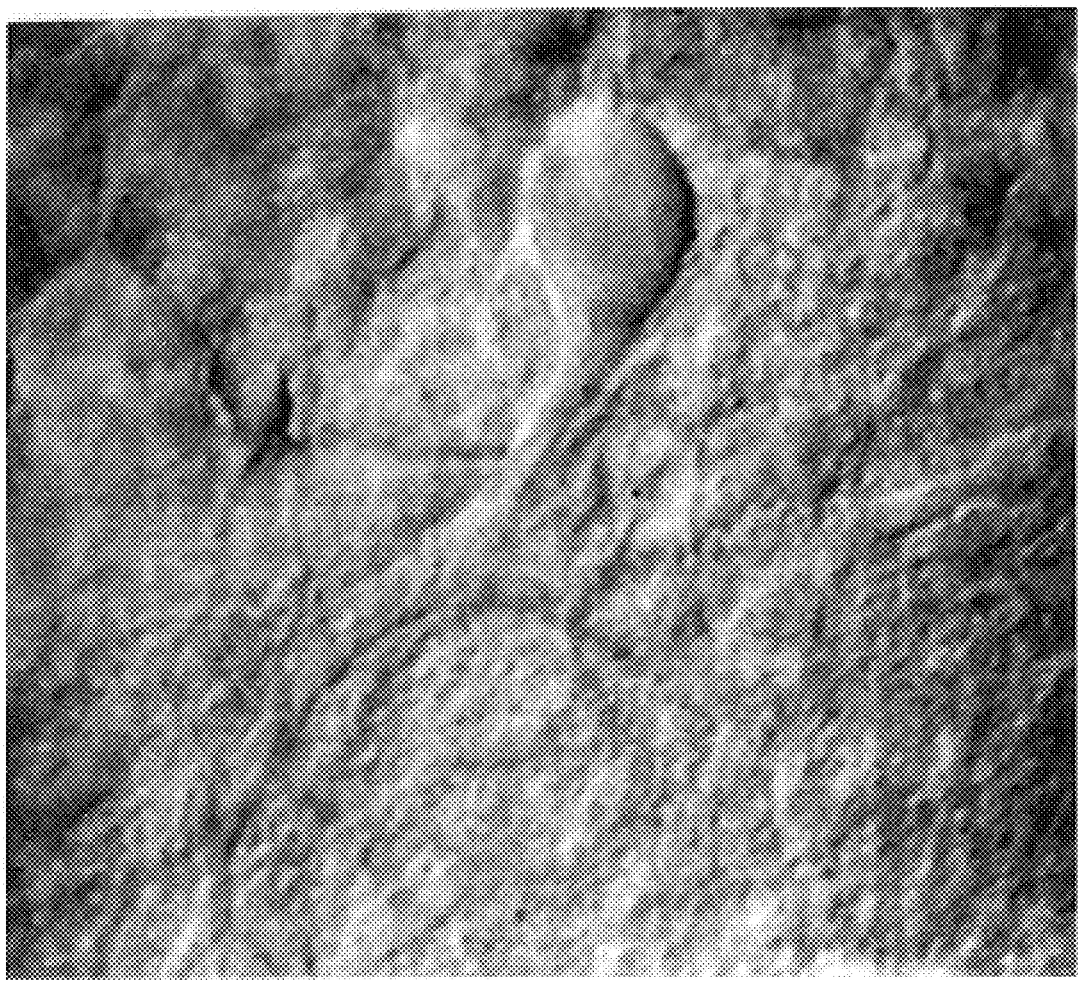
FIG. 14 is a picture showing an observation image of rat brain slices in the cerebellum, obtained by the use of the observation system of the microscope of the second embodiment.

By this system, the image of the specimen 6a is projected, through the objective unit 7, on the electronic image pick-up device 11 at a total magnification of 100×. The image signal produced by the electronic image pick-up device 11 is sent through the image processor 12 to the display monitor 13, where the image is displayed. FIG. 14 is a picture in which the image displayed on the display monitor 13 is printed by a Hitachi VY-100 TV printer. This picture shows that it is possible to make observations on neurons lying at a depth of about 150 $\mu$m below the surface of the specimen that have never been done by any conventional technique.

Although an upright microscope is used in the above observation technique, the microscope of the present invention is not limited to this type, and thus, even when an inverted microscope is used, the same effect can be brought about.

Fourth Embodiment

Figure 15:
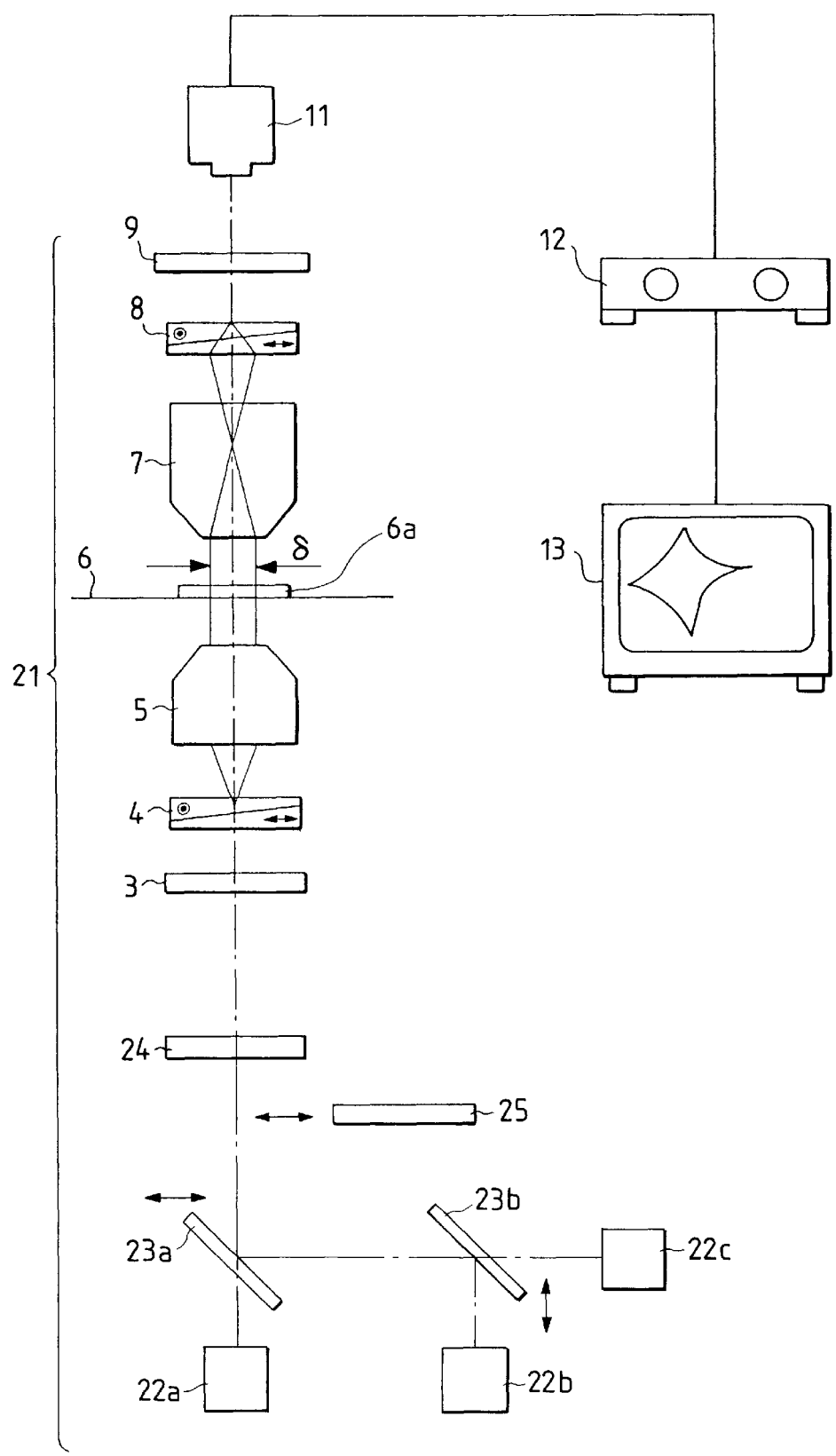
FIG. 15 is a view showing the arrangement of the observation system of the microscope of a fourth embodiment in the present invention.

FIG. 15 shows the arrangement of the observation system of the near-infrared microscope in this embodiment. A near-infrared microscope 21 used in the microscope observation system of the fourth embodiment employs a laser as the light source device for illumination. With the exception of the light source device for illumination, the components of this system are the same as those of the first embodiment, and thus a detailed explanation for the components is omitted.

In the fourth embodiment, the light source device for illumination is essentially constructed with lasers 22a, 22b, and 22c for oscillating wavelengths in the near-infrared region and wavelength selective elements 23a and 23b for selecting wavelengths used for observation from among wavelengths from the above lasers. In the light source device for illumination of the fourth embodiment, a diffuser 24 is interposed between the wavelength selective element 23a and the polymer polarizing film 3. Although the diffuser 24 is used as an optical element having the function of reducing the coherence of laser light, it serves to diffuse the light and thus allows the observation system to be illuminated over a wide range as in the halogen lamp.

For each of the lasers 22a, 22b, and 22c, for example, a gas laser or semiconductor laser for oscillating wavelengths in the near-infrared region is used, but each laser may be of the type that laser light of a plurality of different wavelengths is oscillated.

As for each of the wavelength selective elements 23a and 23b, a mirror or dichroic mirror is used. Where the mirror is used as each of the wavelength selective elements, it is placed to be movable in the direction of an arrow in the figure. For example, when laser light from the laser 22a is used as illumination light, the wavelength selective element 23a is shifted from the illumination optical path, while when laser light from the laser 22c is used as the illumination light, the wavelength selective element 23a is introduced into the illumination optical path and the wavelength selective element 23b is shifted from the illumination optical path. In order to move the mirror, it is only necessary to utilize the slider mechanism used in the conventional microscope.

Where the dichroic mirror is used as each of the wavelength selective elements, it can be slid by the slider mechanism as in the case of the mirror, but may be always placed in the illumination optical path. In this case, however, the specimen is irradiated with laser light of different wavelengths. Hence, it is merely necessary that a near-infrared transmitting filter 25 is designed to be movable in, or out of, the illumination optical path, in accordance with a near-infrared wavelength used, between the wavelength selective element 23a and the diffuser 24.

Since the fourth embodiment uses the lasers, the wavelength region of near-infrared light is very narrow compared with that derived from the light source device for illumination of the first embodiment. Consequently, chromatic aberration from which the objective unit suffers can be kept to a minimum, and a good image is obtained. Moreover, since a laser has high luminance, it is avoidable that the amount of light becomes insufficient, although the wavelength region is narrow.

Fifth Embodiment

Figure 16:
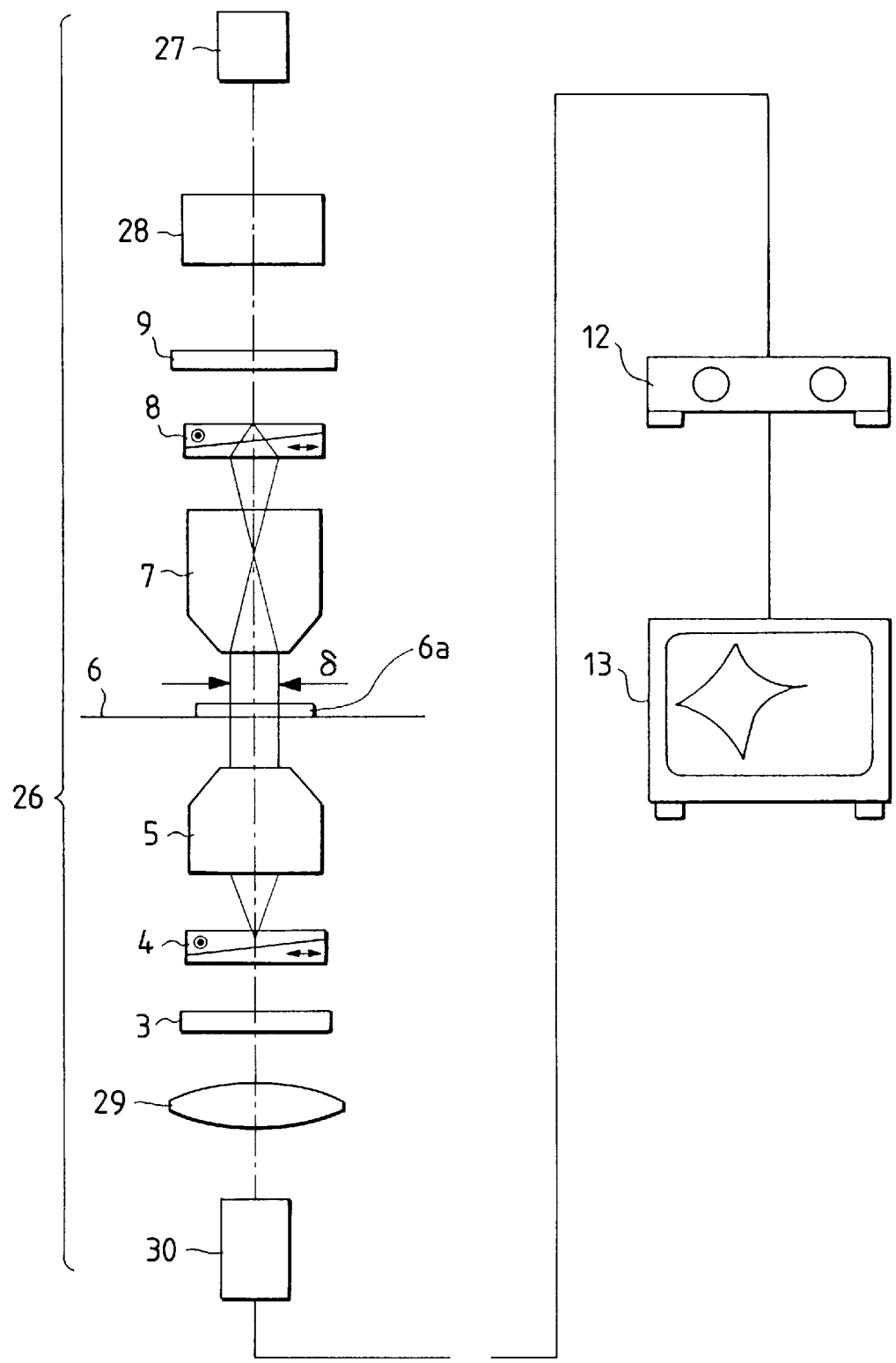
FIG. 16 is a view showing the arrangement of the observation system of the microscope of a fifth embodiment in the present invention.

FIG. 16 shows the arrangement of the observation system of the near-infrared microscope in this embodiment. A near-infrared microscope 26 used in the microscope observation system of the fifth embodiment employs a laser 27 as the light source device for illumination, as in the fourth embodiment, and is further equipped with a scanning optical system 28, having the construction of a so-called scanning optical microscope. With the exception of the light source device for illumination, the components of this system are the same as those of the first embodiment, and thus a detailed explanation for the components is omitted.

Laser light of near-infrared wavelengths emitted from the laser 27 passes through the scanning optical system 28 and is condensed on or inside the specimen 6a by the objective unit 7. At this time, the laser light assumes the shape of a spot into which it is condensed to the extent of diffraction limit and thus information on one point is merely acquired. Thus, the specimen 6a is scanned two-dimensionally with this spot through the scanning optical system 28 to secure image information on the specimen 6a.

The scanning optical system 28 has two vibrating mirrors, which are arranged so that one mirror deflects the laser light in an X (horizontal) direction and the other mirror in a Y (vertical) direction.

The laser light passing through the specimen 6a is collected by the condenser lens 5 and introduced to a photomultiplier tube 30 by a pupil relay optical system 29 located behind the condenser lens 5. The laser light incident on the photomultiplier tube 30 is converted into an electric signal and transmitted to the image processor 12.

Since the fifth embodiment, like the fourth embodiment, uses the laser, chromatic aberration from which the objective unit suffers can be kept to a minimum and a favorable image is obtained. Further, the use of the spot allows the specimen to be sufficiently illuminated. Moreover, since unnecessary scattering of light is not produced except for the area of the specimen which is illuminated by the spot, an image with good contrast can be obtained, compared with the case where the entire specimen is illuminated as in other embodiments.

What is claimed is:

1. A near-infrared microscope comprising:
    a light source device for illumination;
    an illuminating optical system for illuminating a specimen with illumination light from said light source device for illumination; and
    an observing optical system for observing the specimen, said light source device for illumination selectively producing light substantially totally within a wavelength region ranging from 600 to 900 nm, and
    said illuminating optical system and said observing optical system include a contrast producing unit for yielding a contrast of the specimen.

2. A near-infrared microscope according to claim 1, wherein said observing optical system includes an objective lens that is applicable to light of wavelengths in a visible region.

3. A near-infrared microscope according to claims 1 or 2, wherein said light source device for illumination includes a light source for emitting infrared rays and a near-infrared selective filter for selectively transmitting light in a wavelength region ranging from 600 to 900 nm.

4. A near-infrared microscope according to claim 3, wherein said near-infrared selective filter transmits wavelengths ranging from 700 to 850 nm and has an average transmittance of at least 80% with respect to transmitted wavelengths.

5. A near-infrared microscope according to claims 1 or 2, wherein said light source device for illumination has a laser for oscillating light of wavelengths ranging from 600 to 900 nm.

6. A near-infrared microscope according to claim 5, wherein said light source device for illumination includes a plurality of lasers and a plurality of wavelength selective elements.

7. A near-infrared microscope according to claim 5, wherein said light source device for illumination includes an optical element having a function of reducing a coherence of laser light.

8. A near-infrared microscope according to claims 1 or 2, wherein said contrast producing unit includes wavefront splitting means for breaking up a wavefront from said light source device for illumination into two segments which are in phase with each other and wavefront combining means for recombining the two segments transmitted through the specimen.

9. A near-infrared microscope according to claim 8, wherein said wavefront splitting means includes a first polarizing means for polarizing light from said light source device for illumination in a predetermined direction and a first birefringent optical element for dividing the light polarized by said first polarizing means into two components, an ordinary ray and an extraordinary ray, whose vibrating directions are perpendicular to each other, while said wavefront combining means includes a second birefringent optical element for recombining the ordinary ray and the extraordinary ray and a second polarizing mean for causing rays recombined by said second birefringent optical element to interfere with each other.

10. A near-infrared microscope according to claim 9, wherein each of said first polarizing means and said second polarizing means is composed of a polarizing film oriented by containing dichromatic dye in a polymer film.

11. A near-infrared microscope according to claim 9, wherein each of said first polarizing means and said second polarizing means is composed of a polarizing element in which silver crystals, after being elongated, are arranged in one direction in glass.

12. A near-infrared microscope according to claim 9, satisfying a condition:

$$0.25\epsilon < \delta < 0.7\epsilon$$

where $\delta$ is an amount of separation between the ordinary ray and the extraordinary ray and $\epsilon$ is a resolving power of an objective lens and shows a value corresponding to a wavelength of 546.07 nm (the e line).

13. A near-infrared microscope according to claims 1 or 2, wherein said contrast producing unit is constructed to make oblique illumination.

14. A near-infrared microscope according to claim 1, wherein an internal observation of organic tissue is made.

15. A near-infrared microscope according to claim 1, wherein an organic specimen with a thickness of at least 200 $\mu$m is observed at a depth of at least 100 $\mu$m below a surface of the specimen.

16. A near-infrared microscope according to claim 1, wherein a microscope observation is made by a patch clamp technique.

17. A near-infrared microscope according to claims 1 or 2, further comprising image pick-up means for electrically converting an image of the specimen formed through said near-infrared microscope, and image processing means for enhancing a contrast of an image signal from said image pick-up means.

18. An interference microscope, comprising:
a light source device;
a specimen stage disposed proximate to said light source device;
an illuminating optical system disposed between said light source device and said specimen stage such that it receives light from said light source device and outputs illumination light directed onto said specimen stage; and
an observing optical system disposed proximate to said specimen stage on a side opposite to said illuminating optical system in the sense that it receives light from said illuminating optical system that has passed at least partially through a specimen disposed on said specimen stage,
wherein said illuminating optical system and said observing optical system include a contrast producing unit, and said light source device includes a light source of near-infrared light and a near-infrared transmitting filter that has a passband substantially totally within a wavelength region ranging from 600 nm to 900 nm.

19. An interference microscope according to claim 18, wherein said contrast producing unit includes a wavefront splitter in said illuminating optical system and a wavefront combiner in said observing optical system.

20. An interference microscope according to claim 19, wherein said wavefront splitter includes a first polarizer and a first birefringent optical element, and said wavefront combiner includes a second birefringent optical element and a second polarizer.

21. An interference microscope according to claim 20, wherein the condition $$0.25\epsilon < \delta < 0.7\epsilon$$

is satisfied, where $\delta$ is an amount of separation between the ordinary ray and the extraordinary ray produced by said first birefringent optical element and $\epsilon$ is a resolving power of an objective lens of said interference microscope.

22. An interference microscope according to claim 18, further comprising:
an image pick-up device disposed on a light output side of said observing optical system; and
an image processor in communication with said image pick-up device.

23. An infrared microscopic method, comprising:
illuminating a biological specimen with infrared radiation from an illuminating optical system; and
imaging a portion of said infrared radiation that has passed through at least a portion of said specimen with an observing optical system,
wherein said infrared radiation is preselected to produce light substantially totally within a wavelength range of 600 nm to 900 nm, and
said illuminating and observing optical systems include a contrast producing unit.

24. An infrared microscopic method according to claim 23, wherein an internal observation of organic tissue is made.

25. An infrared microscopic method according to claim 23, wherein an organic specimen with a thickness of at least 200 $\mu$m is observed at a depth of at least 100 $\mu$m below a surface of the specimen.

26. An infrared microscopic method according to claim 23, wherein a patch clamp type observation is made.

* * * * *